United States Patent [19]
Jyo et al.

[11] 3,968,316
[45] July 6, 1976

[54] PROCESS FOR THE SURFACE TREATMENT OF UNSATURATED RUBBER

[75] Inventors: Yoshio Jyo; Yoshio Wada; Mitsuyoshi Aonuma, all of Yokohama; Takeo Kobayashi; Kyouzi Inokuchi, both of Kawasaki, all of Japan

[73] Assignee: Nippon Zeon Co., Ltd., Japan

[22] Filed: Oct. 1, 1973

[21] Appl. No.: 402,167

[52] U.S. Cl................................ 428/492; 427/400; 427/444; 428/440; 428/465; 428/473; 428/511; 428/521
[51] Int. Cl.².................... B32B 25/04; B32B 25/12
[58] Field of Search............... 117/47 A, 138.8 UA, 117/139, 138, 138.8 E; 427/400, 444; 428/492, 440, 465, 473, 521

[56] References Cited
UNITED STATES PATENTS

| | | | |
|---|---|---|---|
| 2,102,456 | 12/1937 | Brill et al. | 260/1 |
| 2,587,274 | 2/1952 | Barton et al. | 117/118 |
| 2,801,446 | 8/1957 | Wolinski | 18/48 |
| 2,993,801 | 7/1961 | Hoehne | 117/7 |
| 3,080,255 | 3/1963 | Winkelmann | 117/47 |
| 3,352,818 | 11/1967 | Meyer et al. | 260/47.5 |
| 3,598,630 | 8/1971 | Doty et al. | 117/47 |
| 3,616,195 | 10/1971 | Rendleman et al. | 161/215 |
| 3,661,839 | 5/1972 | Klopfer | 260/41 |

FOREIGN PATENTS OR APPLICATIONS

| | | |
|---|---|---|
| 702,928 | 1/1954 | United Kingdom |
| 791,280 | 2/1958 | United Kingdom |

*Primary Examiner*—P. E. Willis, Jr.
*Attorney, Agent, or Firm*—Bucknam and Archer

[57] ABSTRACT

A process for the surface treatment of a rubber or synthetic resin containing ethylenic unsaturation by contacting the rubber or resin with an alkyl hypohalite and a compound containing an active hydrogen and a functional group, thereby improving or providing the rubber or resin in or with such properties as adhesion, printability, dyeability, flame retardation, self-extinction, antistatic property, weatherproofing, adsorbency, ion-exchangeability and anti-permeability.

13 Claims, No Drawings

PROCESS FOR THE SURFACE TREATMENT OF UNSATURATED RUBBER

This invention relates to a process for the surface treatment of a rubber or synthetic resin containing ethylenic unsaturation. More particularly, it relates to a process for the surface treatment of a rubber or synthetic resin containing carbon-to-carbon double bonds by contacting the rubber or resin, whether it is in the form of a mass or shaped article, with an alkyl hypohalite and a compound containing at least one active hydrogen and at least one functional group, to improve or provide the rubber or resin in or with such properties as adhesion, printability, dyeability, flame retardation, self-extinction, antistatic property, anti-bleaching, weatherproofing, adsorbency, ion-exchangeability and anti-permeability.

There have heretofore been found very few adhesives or binders which are capable of securely adhering to a rubber or synthetic resin whether it may be in the form of blocks, sheets or shaped articles. Thus, even if it is attempted to bond such rubber or resin to another material such as metal, fibers, lumber or glass, using as the binder a binder capable of strongly bonding with the latter, the resulting composite would have a high tendency to allow the rubber or resin and the binder to easily peel or separate from each other. For, for example, rubber vulcanizates used as a substrate to which some other material is to be bonded, it is considered preferable to use as a binder a chloroprene rubber type binder which is satisfactory in adhesion and cohesion. Even in this case, however, mutual diffusion will not be caused between the rubber molecules of the rubber vulcanizate surface and those of the binder since the former molecules are restricted in motion due to being crosslinked, thereby rendering it difficult to effect a secure bond between the substrate and the binder. In addition, the use of a binder having less polarity than the substrate will not give a secure bond due to a low physical interaction between the two. As another example, soft- or paste-type vinyl chloride resins have heretofore been used as a material for use as cable coatings, toys, sheets, clothing's wrappers, sponge, containers, tiles, wall plates, chemical shoes, films for agricultural uses, and the like. These vinyl chloride resins are very often required to be capable of binding with other materials and it is difficult, however, for them to have enough capability of adhesion since they contain large proportions of a plasticizer, softener and solvent as additives.

In an attempt to overcome these drawbacks, shaped rubber or synthetic resin articles used as a substrate with which another material is to be bonded, have heretofore been subjected to various surface treatments. The surface treatments are effected by the use of the following illustrative processes.

1. A process comprising removing from the surface of the substrate the sulphur, accelerating agent, wax, process oil, plasticizer and the like blooming thereon and then mechanically grinding the thus-treated surface to make it rough.

2. A process comprising immersing the surface of the substrate in concentrated sulphuric acid for 2 – 10 minutes, washing the acid-treated surface with cool water and then with hot water, and then drying the surface so washed.

3. A process comprising treating with a treating solution composed mainly of a mixture of an organic monocarboxylic acid and phosphoric acid.

4. A process comprising chlorinating the surface of the substrate with hydrochloric acid or chlorine.

5. A process comprising swelling synthetic resin substrates in an organic solvent and contacting them with each other.

6. A process comprising heat fusing by the use of induction heating.

The process (1) does not give uniform bond strength due to possible non-uniform degree of grinding, and the process control is thus difficult. In addition, the grinding needs a considerable amount of time and labor thereby limiting the reproducibility and it further produces rubber or synthetic resin dust from the substrate, which dust raises a sanitary problem.

The process (2) is operationally complicated, takes much time to be effected and does not give satisfactory bond strength.

The processes (2), (3) and (4) are all considered to have the substrate and a binder physically bonded together by introducing polar groups to the surface of the substrate, thereby increasing the bond strength. However, they are applicable to certain limited fields since they select specific binders to give a good result and, in addition, they will be unable to greatly enhance the bond strength between the substrate and the binder.

The processes (5) and (6) are applicable mainly to effecting a bond between the same synthetic resin materials with the result of unsatisfactory bond strength, and they are unsuitable for use in effecting a bond between different materials.

An object of this invention is to provide a process for effecting an extremely secure, physical or chemical bond between the rubber or synthetic resin substrate and the usual reactive binder. This object is achieved by contacting the surface of the substrate with a treating agent comprising an alkyl hypohalite and a compound containing at least one active hydrogen and at least one functional group capable of chemically or physically combining with the binder, prior to contacting the substrate through the binder with something to be bonded with the substrate.

In many cases, the rubber or synthetic resin substrate may contain various fillers which contain ethylenic unsaturation (this meaning "carbon-to-carbon double bonds" throughout the specification) and are suitable for use as fillers for the substrate, thereby to give at a lower production cost a product substrate which has covering power and elasticity and is improved in dimensional stability, impact strength, wear resistance, heat resistance, tensile strength and the like. In this case, the degree of adhesion at the interface between the substrate and the filler will have a great effect on the properties of a product to be obtained and it is therefore important to enhance the adhesion in order to obtain a product having such improved properties.

Waste rubber produced at the time of manufacture of rubber articles, used rubber articles such as used tires, residual carbonized substance obtained by dry distilling said rubbery materials, used vinyl chloride resin articles in the carbonized state, and the like each in particulate form, have been studied by the present inventors in an attempt to make the effective use thereof as such fillers as above. Also in this case, however, the adhesion between the substrate and the filler has been found unsatisfactory.

Intense studies have also been made by the present inventors in an attempt to greatly improve the adhesion of the fillers to the substrate which has ethylenic unsaturation and, as a result of their studies, it has now been found that if the fillers are contacted at their surface with a treating agent comprising an alkyl hypohalite and a compound containing at least one active hydrogen and at least one functional group capable of physically or chemically combining with the substrate then they will securely be bonded with the substrate.

It has also been attempted to coat the rubber or synthetic resin substrate with a paint in order to provide it with resistance to chemicals, surface hardness, gloss, attractive appearance and the like, and it has also been attempted to be printed with a printing ink. It is difficult, however, to form an excellent coating on the substrate because of its poor affinity with the paint or printing ink.

Another object of this invention is to provide a process for treating the surface of the rubber or synthetic resin substrate thereby to allow a smooth coating of a paint or printing ink to be formed on, and securely bonded with, the treated surface. This object is attained by contacting the surface of the substrate with a treating solution comprising an alkyl hypohalite and a compound containing at least one active hydrogen and at least one functional group capable of physically or chemically combining with the paint or printing ink prior to the application of the paint or printing ink to the substrate.

Conventional shaped articles of rubber or synthetic resin generally tend to be electrostatically charged. Such electrostatic charge will cause various troubles such as attachment of foreign materials to the articles, dirtying of the surface of the articles, electric shock and ignition of solvents used in processing as well as decrease in efficiency of production, working and utilization of the articles. Thus it has been attempted to provide such articles with antistatic property by treating their surface with a surface-active agent or inorganic salt or with an electricity rejector using a high voltage power source. These attempts, however, have not entirely been successful, leaving unsolved the problems of duration of antistatic property and of requirement of special apparatus for realizing the attempts.

Another object of this invention is to provide a process for easily providing the rubber or synthetic resin substrate with excellent antistatic property without deteriorating the substrate in quality. This object is achieved by contacting, in the presence of an alkyl hypohalite, the surface of the substrate with a compound containing at least one active hydrogen and at least one functional group or electrically polar group.

It has also been found by the present inventors that such a surface treating process as above is also applicable to the inhibition of the rubber substrate to allow hydrocarbons to permeate therethrough.

Hydrocarbons such as those which are exhausted from the fuel systems of motor vehicles, are one of the main causes for environmental pollution. A substantial amount of the hydrocarbons from these fuel systems is permeated to the atmosphere through the wall of rubber fuel hoses. Processes for preventing or inhibiting such rubber fuel hoses from allowing hydrocarbons to permeate therethrough had not been found before this invention has been accomplished. Such processes have greatly been desired from the view-point of the prevention of environmental pollution. This problem, however, is solved by contacting rubber articles such as hoses and sheets containing ethylenic unsaturation with an alkyl hypohalite and a compound containing at least one active hydrogen and at least one functional group. The term "hydrocarbons" used herein is intended to mean hydrocarbons and halogenated hydrocarbons, such as gasoline and Freon, which are both liquid and evaporable at ambient temperature.

The rubber or synthetic resin material containing ethylenic unsaturation can be improved in adsorbing and ion exchanging capabilities by subjecting said material to the surface treatment according to this invention.

Adsorbents or ion-exchange resins have heretofore been employed in removal of harmful ingredients from drainage and gases containing the harmful ingredients and being exhausted from factories and the like, in removal of urea from blood containing the urea and in conversion of sea water to fresh water. Such ion-exchange resins are in a rapidly increasing demand with the aggravation of the environments. The adsorbents which have conventionally been used, include high molecular compounds to which functional groups having adsorbing capability have chemically been introduced, activated carbon, molecular sieves and the like. Typical of the conventional ion-exchange resins are those which are prepared by introducing ion-exchangeable functional groups into a styrene-divinylbenzene copolymer, methacrylic acid-divinylbenzene copolymer or the like.

Still another object of this invention is to provide a process for manufacturing novel adsorbents or ion-exchange resins, the process being different from the conventional ones. This object is accomplished by contacting, in the presence of an alkyl hypohalite, a rubber or synthetic material having ethylenic unsaturation with a compound containing at least one active hydrogen and a functional group having adsorbing or ion-exchanging capabilities.

Furthermore, the rubber or synthetic resin material containing ethylenic unsaturation will provide fibers or paper with special properties such as flame-retardation, self-extinction, adhesion, dyeability and antistatic property by applying said unsaturated material to the fibers or paper and then contacting, in the presence of an alkyl hypohalite, the whole mass with a compound containing at least one active hydrogen and at least one functional group.

Studies of flame retardation have not fully been made on cellulosic fibers and paper, setting synthetic fibers apart. Therefore, there are now found very few useful processes for flame retardation. For the flame retardation of cellulosic material, the following illustrative processes have usually been employed:

A process comprising adding antimony oxide, a phosphor compound, halogenide, inorganic filler or the like to cellulosic material at the time of spinning;

A process comprising impregnating such a flame-retarding agent as mentioned above into cellulosic fibers or sprinkling the agent thereon; and A process comprising reacting cellulosic fibers with a flame-retarding agent.

These conventional processes are operationally complicated and, further, the cellulosic fibers treated thereby will gradually be freed of the flame-retarding agent due to their contact with water as in the case of rinsing and washing, thereby rendering it difficult to obtain a long duration of flame retardation on the fibers. In addition, the use of an inorganic acid as a flame retarding agent in cellulosic material will cause the hydrolysis thereof thereby remarkably deteriorating it in quality.

In order to provide fibers and paper with antistatic property, on the other hand, it has been tried to treat them with a surface-active agent or an inorganic salt or with an electricity rejector using a high-voltage power source. These treatments, however, are not so recommendable since they leave unsolved the problems that the fibers and paper so treated have a short duration of antistatic property and a special apparatus for effecting the treatments is needed. The polymers containing ethylenic unsaturation which are to be applied to these fibers or paper, may be normally liquid or may be in the form of a latex of natural rubber, synthetic rubber or synthetic resin, or a solution of natural rubber, synthetic rubber or synthetic resin in organic solvents. Particularly a rubber latex containing vinyl pyridine or carboxyl groups, when applied to the cellulosic material, will give thereon a preferable flexible rubber coating which is excellently bonded with and spread over the cellulosic material. The use of a rubber latex or liquid rubber containing vinyl pyridine or carboxyl groups will give a product having excellent water-repellency which will not be lost after several-time washing of the product. Such products are useful as those which are less hygroscopic and wettable. The amount of the polymer applied to the fibers or paper is in the range of not less than about 4%, preferably not less than about 10%, by weight of the fibers or paper. With the increase in amount of the polymer used, the product to be obtained will increasingly be provided with self-extinction. The application of the polymer may be effected by means of immersion, impregnation, coating, spraying or the like, or by graft-polymerizing monomers, which are capable of forming the polymer, on the fibers or paper.

A further object of this invention is to provide a process for providing, without deterioration in quality, fibers or paper with special properties such as flame retardation, self-extinction, antistatic property, printability, dyeability and the like. This object is attained by applying to fibers or paper the rubber or synthetic resin material containing ethylenic unsaturation and then contacting, in the presence of an alkyl hypohalite, the thus-applied unsaturated material with a compound containing at least one active hydrogen and at least one functional group. The fibers which may be used include natural fibers such as cotton, hemp, wool and silk; chemical fibers such as polyesters, polyamides, acrylics, polyvinyl chloride, polypropylene, rayon and acetate; and fibers obtained by mixed spinning of these natural and chemical fibers. These fibers, whether they may be in the form of woven cloth, knitted cloth, non-woven cloth or spun yarn, can be subjected to the treatment according to this invention.

The rubber substrates or materials which may be used in the practice of this invention are those containing ethylenic unsaturation and they include natural rubber, polyisoprene rubber, polybutadiene rubber, butadiene-isoprene copolymer rubber, styrene-butadiene copolymer rubber, styrene-isoprene copolymer rubber, acrylonitrile-butadiene copolymer rubber, acrylonitrile-isoprene copolymer rubber, acrylonitrile-butadiene-isoprene copolymer rubber, high styrene rubber, polypentenamer, polychloroprene rubber, ethylene-propylene-diene terpolymer rubber, epi-chlorohydrin-unsaturated epoxide copolymer rubber and isobutylene-isoprene copolymer rubber. These rubbers may be in the vulcanized form depending upon the purpose for which they are used. For example, they are in the vulcanized form when they are a shaped article.

The synthetic resin substrates or materials used herein include acrylonitrile-butadiene-styrene copolymer resin, methyl methacrylate-butadiene-styrene copolymer resin, highly styrene unit-containing resin, polybutadiene resin, so-called high impact polystyrene prepared by graft-polymerizing with styrene polybutadiene, styrene-butadiene copolymer, styrene-isoprene copolymer or the like, and unsaturated polyester resin. There may also be used a mixture of said rubber with synthetic resin and a mixture of rubber or synthetic resin containing no ethylenic unsaturation with said unsaturated rubber or synthetic resin. Furthermore, there may also be used a mixture of rubber or synthetic resin having no ethylenic unsaturation with a low molecular compound having ethylenic unsaturation. The low molecular compounds include allyl alcohol ester type plasticizers such as allyl acrylate, triallyl cyanurate, diallyl maleate, dichlorallyl maleate, diallyl itaconate, diallyl glycolate, triallyl aconate, diallyl phthalate, diallyl isophthalate, diallyl phosphate, diallyl monobutylphosphate and triallyl monooctylphosphate; acrylic acid ester type plasticizers such as triethyleneglycol diacrylate, tetraethyleneglycol dimethacrylate, trimethylolpropane trimethacrylate, butane-1,4-diol diacrylate, butane-1,4-diol dimethacrylate, dimethacrylate (bis-diethylene glycol) phthalate and the derivatives thereof; organic acid vinyl esters such as adipic acid vinyl ester and sebacic acid vinyl ester; high boiling compounds derived from cyclic vinyl compounds, such as the nuclear substitution derivatives of cyclohexene and the derivatives of cyclopentene, cyclopentadiene, dicyclopentadiene and the like; olefinic compounds such as di-, tri- or tetrallylethane, di-, tri- or tetrallylpropane, and di-, tri- or tetrallylbutane; and chain organic acids having inter-carbon ethylenic unsaturation, such as dimeric acid. These low molecular compounds may be used in amounts of 1 – 70 parts by weight per 100 parts by weight of the rubber or synthetic resin used. They are preferably incorporated particularly in soft- or paste-type vinyl chloride resins thereby obtaining a composite wherein the components are excellently bonded together. As required, the rubber or synthetic resin substrate or material may be incorporated with the usual additives such as reinforcing agents, fillers, softeners, plasticizers, stabilizers, anti-aging agents and adjuvants for working.

Preferable alkyl hypohalites of those which may be used in the practice of this invention, are tertiary-alkyl hypohalites such as tertiary-butyl and tertiary-amyl hypohalites which are more stable than normal-alkyl and secondary-alkyl hypohalites. Ter.-butyl hypochlorite and ter.-butyl hypobromite are particularly preferable. Halogen-substituted alkyl hypohalites such as dichloromethyl, trichloromethyl, difluoromethyl and trifluoromethyl hypochlorites may also be used.

The compounds which are used together with the alkyl hypohalites, contain at least one active hydrogen and at least one functional group. The active hydrogen may be substituted by a hydroxyl, carboxylic or like group capable of producing an active hydrogen. The functional group may be a hydroxyl, carboxyl, aldehyde, amino, epoxy, mercapto or sulfonyl group, and it may also be a chlorine radical or the like. Said compounds used together with the alkyl hypohalites may sometimes be hereinafter referred to as "functional compounds". Typical of the functional compounds are sulphuric acid, phosphoric acid, glycol, resorcin, 2-methyl-2,4-pentenediol, glycerine, malic acid, maleic acid, malonic acid, aldol, formamide, glycydol, thioglycolic acid, sulfonic acid and hydrochloric acid.

According to this invention, it is preferable to select a suitable one of these functional compounds for use together with the alkyl hypohalite, depending upon the properties desired in the end product.

In a case where it is desired that the end product have an improved adhesion to a reactive binder there is selected such functional compound as will effect a secure physical or chemical bond with the binder. The term "physical bond" is intended to mean "bond" (including hydrogen bond, Van dev Wall's bond and the like) which is not chemical bond but is capable of causing interaction or inter-diffusion. Among the aforesaid functional compounds, are particularly preferable those which are capable of chemically bonding with the binder or have at least two of the aforesaid functional groups in addition to active hydrogen or active hydrogen-producible group. The functional compound is usually used in amounts of 0.1 – 10 mol per mol of alkyl hypohalite. If either one of the alkyl hypohalite and functional compound is used, there will not be obtained a remarkably improved bond between the rubber or synthetic resin substrate and the binder. In order to treat its surface, the rubber or synthetic resin substrate or material may be immersed in, coated with, or sprayed with a mixture of the alkyl hypohalite and functional compound. In this case, these treating agents may be used separately or one after another. At least one of them may also be used in solution in a solvent which does not react therewith. If both of the treating agents are to be used in solution, they may be dissolved in a common solvent therefor or each of them may be dissolved in a solvent which does not react with it. The solvents used herein include aliphatic hydrocarbons such as heptane, n-hexane and cyclohexane; aromatic hydrocarbons such as benzene, nitrobenzene, halogenated benzene, toluene and xylene; ethers such as diethyl ether, dioxane and tetrahydrofuran; esters such as ethyl acetate; ketones such as methyl ethyl ketone and cyclohexanone; chlorinated hydrocarbons such as ethyl chloride, chloroform and carbon tetrachloride; tertiary alcohols such as t.-butyl alcohol; carbon disulphide; and the mixtures thereof. Other solvents which do not react with alkyl hypohalites and/or the functional compounds, may also be used herein as a solvent. Immersion time, when the surface treatment is effected by means of immersion, depends upon the kind of the substrate or material to be treated, the kind of the treating agents used, the kind of the solvent used and the concentration of the treating solution used, and less than several minutes is enough therefor. Material to be bonded with the surface-treated substrate or material and the reactive binder used in this case are not limitative and suitably selected and combined for use in view of the adhesion between the two. Typical of the material to be bonded are vulcanized or non-vulcanized rubber, synthetic resins (including those in the paste or sol form), metals, fibers, leather, lumber, glass, concrete and the like. If the material to be bonded is materially the same as the substrate, then it is preferable to subject both of them to the surface treatment according to this invention. The term "reactive binder" used herein is intended to mean a binder capable of physically or chemically bonding with the functional compound. Typical of the reactive binder are epoxy, isocyanate, phenol, cyanoacrylate, melamine, urea, urethane and vinyl acetate resins as well as rubber, starch, natural resins and petroleum resins.

After being subjected to the surface treatment as previously mentioned, at least one of the substrate and the material to be bonded is coated with the binder by the usual method (if the material to be bonded is a sol of paste vinyl chloride resin, then the binder may be incorporated in the sol). Both of them are contacted with each other with the binder therebetween at ambient temperature to 100°C at atmospheric or elevated pressures to bond them with each other thereby obtaining a composite.

The mechanism of bonding according to this invention is not thoroughly known yet. It is considered, however, that the alkyl hypohalite reacts with the substrate at the carbon-to-carbon double bonds present in the surface portion thereof to introduce halogen and an alkoxy group therein and the thus-introduced alkoxy group is then substitution reacted with the active hydrogen of the functional compound thereby combining the functional compound with the substrate. Thus, if there is used a functional compound having affinity with the binder used, then the substrate and the binder would securely be bonded with each other. This applies to the bonding between the substrate and a paint or printing ink to be coated thereon and, in this case, the paint or ink corresponds to said binder. The paints which may be used herein are composed of, as the base material, the usually used materials such as epoxy, urethane, urea-formalin, acrylic, vinyl acetate, phthalic, cellulose nitrate, melamine and fluorocarbon resins as well as synthetic drying oils, lacquer, cashew and linseed oil. The printing ink may be soluble in water or oils. The paints or printing inks may be incorporated with the usual additives such as pigments, dyes and fillers, as required.

As previously mentioned, according to this invention, the alkyl hypohalite and the functional compound are usually used in molar ratios of 0.1 – 10 : 1, preferably 0.5 – 1 : 1. Although the temperature and time for the surface treatment of the substrate or material are not limitative, the former is usually in the range of −50°C to 100°C and the latter usually in the range of less than several minutes. However, the time may be as long as approximated half an hour for the surface treatment for, for example, retaining the paint or printing ink on the substrate or providing the substrate with antistatic property. Furthermore, a still longer time such as several tens of hours, may be needed for providing the substrate or material with special properties such as adsorbency and ion-exchangeability.

This invention will be better understood by the following examples wherein all the parts are by weight unless otherwise specified.

Examples 1 – 17 indicate the improvements in adhesion or binding property.

EXAMPLE 1

A styrene-butadiene rubber compound and an epichlorohydrin rubber compound (Control) respectively prepared by kneading the ingredients indicated in Table 1 on 6-inch rolls, were subjected to press vulcanization at 150°C for 15 and 35 minutes to obtain shaped rubber articles, respectively.

Table 1

| Ingredient | Styrene-butadiene rubber compound | Epichlorohydrin rubber compound |
|---|---|---|
| Styrene-butadiene rubber* | 100 (Parts) | — |
| Epichlorohydrin rubber** | — | 100 (Parts) |
| Zinc oxide | 5 | — |
| Sulphur | 1.8 | — |
| Stearic acid | 1.5 | — |
| Tin stearate | — | 2 |
| HAF carbon black | 40 | — |
| FEF carbon black | — | 40 |
| Dibenzothiazyl disulphide | 1.5 | — |
| Diphenyl guanidine | 0.7 | — |
| 2-mercaptoimidazolin | — | 1.5 |
| Trilead tetraoxide ($Pb_3O_4$) | — | 5 |

*Supplied under the trademark of Nipol 1502 by Nippon Zeon Co., Ltd.
**Supplied under the trademark of Hydrin 100 by B.F. Goodrich Inc.

The surfaces of the shaped rubber articles (substrates) were cleaned with acetone, coated with various treating solutions (a 20% solution of t.-butyl hypochlorite (0.06 mol) or functional compound (0.06 mol) in tetrahydrofuran, and a 20% soluion of t.-butyl hypochlorite (0.06 mol) and functional compound (0.06 mol) inn tetrahydrofuran), allowed to stand for 2 – 3 minutes and then cleaned with methyl ethyl ketone. On the other hand, the surfaces of steel (SAE-1020) pieces to be bonded with the rubber articles were also cleaned with methyl ethyl ketone. Each of the shaped rubber articles and each of the pieces were coated on the cleaned surface with an isocyanate type binder (this type binder being intended to mean throughout the specification a binder supplied under the trademark of Dismodule R by Bayer Co.) and then pressure bonded with each other at 80°C and 100 – 200 g/cm² for one hour to form composites which were then subjected to a 180° peeling test according to JIS (Japanese Industrial Standard) K-6301 corresponding to ASTM D429. The results are shown in Table 2.

Table 2

| Treating agent | Substrate | Peel strength (Kg/cm) Styrene-butadiene rubber | Epichlorohydrin rubber |
|---|---|---|---|
| — | — | 2.7 | 7.5 |
| TBH* | — | 2.8 | — |
| — | Ethylene glycol | 3.5 | — |
| TBH | Ethylene glycol | 12.1 | 3.1 |
| — | 2-methyl-2,4-pentenediol | 5.3 | — |
| TBH | 2-methyl-2,4-pentenediol | 16.4 | 6.5 |

*By "TBH" is meant tertiary-butyl hypochlorite throughout the specification.

Table 2 indicates that the use of the styrene-butadiene rubber as the rubber for the substrate and of the t.-butyl hypochlorite and functional compound as the treating agents, gives a composite product having extremely excellent peel strength as compared with the use of one of the treating agents or none thereof, and that the use of the rubber containing no ethylenic unsaturation in the molecule does not give a composite product wherein the peel strength is increased.

EXAMPLE 2

The ingredients as indicated in Table 3 were kneaded together in the same manner as in Example 1 to form a rubber compound which was then subjected to press vulcanization at 150°C for 35 minutes thereby obtaining shaped rubber articles.

Table 3

| Ingredient | Amount used |
|---|---|
| Acrylonitrile-butadiene rubber* | 100 (Parts) |
| Zinc oxide | 5 |
| Sulphur | 1.5 |
| Stearic acid | 1 |
| HAF carbon black | 40 |
| Dibenzothiazyl disulphide | 2 |
| Diphenyl guanidine | 0.5 |

*Supplied under trademark of Nipol 1042AL by Nippon Zeon Co., Ltd.

The peel test of Example 1 was followed, but using the shaped rubber articles and steel (SAE-1020) pieces treated with the treating agent or agents as shown in Table 4. The results are indicated in this Table.

Table 4

| Treating agent | | Peel strength (Kg/cm) |
|---|---|---|
| — | — | 0.8 |
| —* | — | 1.2 |
| TBH | — | 1.0 |
| — | Conc. $H_2SO_4$** | 0.3 |
| TBH | Conc. $H_2SO_4$ | 3.2 |
| — | HCl | 0.5 |
| TBH | HCl | 2.5 |

*Buffed with emery cloth No. 240
**The rubber articles and steel pieces were immersed in conc. $H_2SO_4$ for 10 minutes, washed with water for 60 minutes and then with boiling water for 60 minutes, and dried.

From Table 4 it is seen that the surface treatment according to this invention gives a composite which is very excellent in peel strength as compared with the surface treatment using t.-butyl hypochlorite only or the conventional surface treatment.

EXAMPLE 3

The same shaped rubber articles as prepared in Example 2 and various materials to be bonded thereto were treated with 20% solution of t.-butyl hypochlorite (0.06 mol) and functional compound (0.06 mol) in an organic solvent and then treated using an isocyanate type binder in the same manner as in Example 1 to form composite products which were subsequently tested for peel strength. The results are shown in Table 5.

Table 5

| Functional compound | Solvent | Material to be bonded | Peel strength (Kg/cm) Steel SAE-1020 | Brass | Chromium Plate | Aluminum |
|---|---|---|---|---|---|---|
| — | — | | 0.8 | 6.4 | 0.7 | 0.6 |
| Ethylene glycol | Tetrahydrofuran | | 4.3 | 13.0 | 1.3 | 1.1 |
| 2-methyl-2,4-pentenediol | " | | 10.1 | 9.3 | 2.3 | 3.0 |

Table 5-continued

| Functional compound | Solvent | Material to be bonded | Peel strength (Kg/cm) | | | |
|---|---|---|---|---|---|---|
| | | | Steel SAE-1020 | Brass | Chromium Plate | Aluminum |
| Resorcin | " | | 3.8 | 11.3 | 3.3 | 2.0 |
| Malic acid | " | | 7.3 | 16.0 | 1.2 | 3.2 |
| Phosphoric acid | Ethyl ether | | 4.8 | 8.1 | 5.2 | 1.6 |
| Glycidol | T.-butyl alcohol | | 3.0 | 10.4 | 4.0 | 2.2 |
| Formamide | Tetrahydrofuran | | 5.0 | 7.7 | 2.8 | 1.5 |
| Salicylic acid | Ethyl ether | | 4.2 | 7.9 | 3.3 | 1.7 |

*Even TBH was not used.

EXAMPLE 4

A test of composite products for peel strength was made in the same manner as in Example 3 except that there were used the treating agents, binders and steel (SAE-1020) pieces as the to-be-bonded material as indicated in Table 6. The results are shown in this Table.

Table 6

| Alkyl hypohalite | Functional compound | Binder Solvent | Peel strength (Kg/cm) | |
|---|---|---|---|---|
| | | | Cyanoacrylate type* | Epoxy type** |
| — | — | — | 1.3 | 1.7 |
| TBH | — | | 2.0 | — |
| " | Ethylene glycol | Tetrahydrofuran | 18.3 | 3.3 |
| " | 2-methyl-2,4-pentenediol | " | 24.0 | 3.2 |
| " | Resorcin | " | 13.8 | 2.4 |
| " | Glycidol | T.-butyl alcohol | 11.1 | 2.5 |
| " | Phosphoric acid | Ethyl ether | 10.7 | 3.5 |

*"Aronalpha", produced by Toagosei Chemical Industry Co., Ltd.
**"Bond E Setclear", produced by Konishi Gisuke Shoten Co., Ltd.
(These notes apply throughout the specification unless otherwise specified.)

EXAMPLE 5

The same test as in Example 4 was carried out, but substituting the steel pieces used in Example 4 by the to-be-bonded material as indicated in Table 7 and treating this material in the same manner as the substrate was treated. The results are shown in Table 7.

Table 7

| Alkyl hypohalite | Functional compound | Solvent | Material to be bonded | Peel strength (Kg/cm) | |
|---|---|---|---|---|---|
| | | | | Acrylonitrile-butadiene-styrene resin* | The same as the substrate (Rubber vulcanizate of Table 3) |
| — | — | — | | 1.1 | 0.7 |
| TBH | 2-methyl-2,4-pentenediol | Tetrahydrofuran | | 19 | 14.1 |

*A terpolymer comprising 25 parts of acrylonitrile, 20 parts of butadiene and 55 parts of styrene.

EXAMPLE 6

The 5 cm long portions of the same acrylonitrile-butadiene-styrene resin pieces (substrates) (2 mm thick × 2 cm wide × 10 cm long) were coated with a treating liquid composed of 0.1 mol t.-butyl alcohol and 0.1 mol functional compound which were diluted with 50 g t.-butyl alcohol, dried at ambient temperature, washed with water and then freed, by wiping, of the water present on the surface of the substrates. The surfaces of the thus-treated substrate and the to-be-bonded material as shown in Table 8 were coated with an epoxy resin type binder to form a layer thereof which was as thin as possible. They were thus bonded with each other under the conditions as indicated in Table 8 to form a composite product. Among the composite products so formed, those wherein the binder layers were faced and bonded to each other were tested for shearing strength, while those wherein the substrate and the to-be-bonded material were together bonded with one binder layer therebetween were tested for peeling strength. These tests were made using a Schopper tensile tester and the results are shown in Table 8. The values for strength were determined by obtaining seven values by repeating the measurement seven times, excluding the highest and lowest values and averaging the remaining five values. In Table 8 the symbol P stands for breakage of binder layer and this applies to the following Examples.

Table 8

| Material to be bonded | Treating agent | | Shearing strength (Kg/cm$^2$) | | Peel strength (Kg/cm) | |
|---|---|---|---|---|---|---|
| | Alkyl hypohalite | Functional compound | Bonded for 3 days at room temp. | Bonded for 2 hours at 60°C | Bonded for 3 days at room temp. | Bonded for 2 hours at 60°C |
| | — | — | 5 | 14 | 0 | 2 |
| | TBH | — | 7 | — | 0 | — |
| | " | Malonic acid | 133 | 105 | P | P |
| Brass | " | Glycidol | 98 | 92 | P | P |

Table 8-continued

| Material to be bonded | Treating agent | | Shearing strength (Kg/cm²) | | Peel strength (Kg/cm) | |
|---|---|---|---|---|---|---|
| | Alkyl hypohalite | Functional compound | Bonded for 3 days at room temp. | Bonded for 2 hours at 60°C | Bonded for 3 days at room temp. | Bonded for 2 hours at 60°C |
| | " | Glycerine | 134 | 128 | P | P |
| | " | 86% phosphoric acid | 104 | 115 | P | P |
| | — | — | 3 | 8 | O | 1.5 |
| | TBH | Malonic acid | 117 | 103 | P | P |
| Aluminum | " | Glycidol | 126 | 92 | P | P |
| | " | Glycerine | 130 | 130 | P | P |
| | " | 86% phosphoric acid | 92 | 101 | P | P |
| | — | — | 7 | 15 | O | 1.1 |
| | TBH | Malonic acid | 108 | 89 | P | P |
| Iron | " | Glycidol | 116 | 86 | P | P |
| | " | Glycerine | 125 | 124 | P | P |
| | " | 86% phosphoric acid | 97 | 97 | P | P |

From Table 8 it is apparent that the process of this invention gives extremely excellent shearing and peel strengths as compared with the processes using TBH only or none of the treating agents.

EXAMPLE 7

The ingredients as shown in Table 9 were thoroughly kneaded on rolls to form a mixture which was then pressed into 2 mm thick sheets.

Table 9

| Ingredient | Compound a | Compound b | Compound c |
|---|---|---|---|
| Vinyl chloride resin*¹ | 100 | 100 | 100 |
| Acrylonitrile-butadiene-styrene resin*² | 7 | — | — |
| Methyl methacrylate-butadiene-styrene resin*³ | — | 7 | — |
| Acrylonitrile-butadiene rubber*⁴ | — | — | 10 |
| Cadmium-Barium type stabilizer | 4 | 4 | 4 |
| Dioctyl phthalate | 5 | 5 | — |

*¹Supplied under the trademark of Geon 103EP by Nippon Zeon Co., Ltd.
*²Supplied under the trademark of Hi-Blen 202 by Nippon Zeon Co., Ltd.
*³Supplied under the trademark of Hi-Blen 203 by Nippon Zeon Co., Ltd.
*⁴Supplied under the trademark of Nipol 1042 by Nippon Zeon Co., Ltd.

Following the procedure of Example 6 except that the aforesaid resin sheets were substituted for the ABS resin substrates, brass was used as the material to be bonded and the adhesion was effected at 60°C for 2 hours, the composites so obtained were tested for shearing strength. The results are summarized in Table 10. In this test the composites were all broken off by the destruction of the resin layers.

Table 10

| Alkyl hypo-halite | Functional compound | Shearing strength (Kg/cm²) | | |
|---|---|---|---|---|
| | | Compound a | Compound b | Compound c |
| — | — | 9 | 3 | 14 |
| TBH | Malonic acid | 116 | 121 | 128 |
| " | Glycerine | 124 | 125 | 135 |
| " | Phosphoric acid | 142 | 123 | 135 |

EXAMPLE 8

Following the procedure of Example 7 except that the polybutadiene-containing polystyrene was used in place of the substrate used in Example 7 and the adhesion or bonding was effected at ambient temperature for 3 days, the composites so obtained were tested for shearing strength. The results are shown in Table 11.

Table 11

| Alkyl hypo-halite | Functional compound | Substrate Shearing strength (Kg/cm²) | |
|---|---|---|---|
| | | Polystyrene containing 10% polybutadiene | Polystyrene containing 5% polybutadiene |
| — | — | 8 | 7.2 |
| TBH | Malonic acid | 47 | 32 |
| " | Glycerine | 45 | 40 |
| " | Phosphoric acid | 38 | 27 |

EXAMPLE 9

The substrates and the to-be-bonded materials as indicated in Table 12 were treated with a solution of t.-butyl hypochlorite and glycerine in t.-butyl alcohol, coated with an epoxy type binder and then heat treated at 60°C for 2 hours to obtain composite products which were then tested for shearing strength. The results are shown in Table 12 wherein the parenthesized numerals are for shearing strength obtained without the use of the treating agents.

Table 12

| Substrate | Material to be bonded | Shearing strength (Kg/cm²) | | |
|---|---|---|---|---|
| | | Lumber | Glass | Cotton canvas |
| ABS resin of Example 5 | | 68 (5) | 82 (3) | Canvas broken (5) |
| Compound b of Example 7 | | 45 (3) | 49 (3) | " (0) |
| Polystyrene containing 10% polybutadiene of Example 8 | | 24 (0) | 40 (0) | " (0) |

EXAMPLE 10

Following the procedure of Example 9 except that the substrates as used in Example 9 were bonded with each other, the composites obtained were tested for shearing strength. The results are shown in Table 13.

Table 13

| Substrate | | | | Shearing strength (Kg/cm²) | | | Polystyrene containing 10% polybuta- diene of Example 8 |
|---|---|---|---|---|---|---|---|
| | | ABS resin of Example 6 | | | Compound b of Example 7 | | |
| Alkyl hypo- halite | Material to be bonded Functio- nal compound | The same as Substrate | Compound b of Example 7 | Polystyrene containing 10% polybuta- diene of Example 8 | The same as Substrate | Polystyrene containing 10% polybuta- diene of Example 8 | The same as Substrate |
| — | — | 0 | 0 | 0 | 0 | 0 | 0 |
| TBH | Malonic acid | 124 | 120 | 64 | 52 | 24 | 31 |
| " | Glycerine | 138 | 124 | 82 | 102 | 81 | 64 |
| " | Phosphoric acid | 108 | 111 | 79 | 100 | 72 | 42 |

EXAMPLE 11

The composites of shearing strength of 107 Kg/cm² prepared in Example 6 by using the ABS resin as the substrate, brass as the material to be bonded to said substrate, TBH and glycerine as the treating agents, and the epoxy type resin as the binder and thermally treating these materials at 60°C for 2 hours, were respectively exposed to the sunlight for 5 and 30 days and then tested for shearing strength with the result that they did not exhibit a decrease in shearing strength and were broken at their resin layer.

In addition, the same composites as mentioned above were immersed in water for 100 hours and allowed to stand in the air at 90°C for 100 hours, respectively, and then tested for shearing strength with the result that they had shearing strengths of 58 Kg/cm² and 32 Kg/cm², respectively. Although, in this case, they exhibited some decrease in shearing strength, they will be seen to still have satisfactory bonding capability due to their absolutely high shearing strength still retained after said immersion or exposure.

EXAMPLE 12

The vulcanized shaped articles of the styrene-butadiene rubber compound prepared in Example 1 were immersed in the treating solutions of Table 14 for 30 seconds, withdrawn from the solutions and allowed to stand for a full day and, on the other hand, the surfaces of steel (SAE-1020) pieces were cleaned with methyl ethyl ketone. The shaped rubber articles and the steel pieces so prepared were coated with an epoxy resin (supplied under the trademark of Sanyu resin A-460 by Sanyu Kogyo Co., Ltd.) and then pressed together at a pressure of 100 – 200 g/cm² and a temperature of 80°C for 1 hour to obtain composites which were subsequently tested for 180° peeling test with the results being indicated in Table 14.

Table 14

| Treating agent | Peel strength (Kg/cm) |
|---|---|
| — | No adhesion |
| 25 vol.% solution of TBH in t.-butyl alcohol | 3.2 |
| 5 vol.% TBH and 4 vol.% HCl (35%) solution in t.-butyl alcohol | 14.8 (Rubber breakage) |

From Table 14 it is understood that the use of TBH singly as the treating agent gives some adhesion while the use of TBH and hydrochloric acid jointly gives extremely superior adhesion even when the TBH is used in a lower concentration.

EXAMPLE 13

The vulcanized shaped articles of the styrene-butadiene rubber compound prepared in Example 1 were washed with acetone, immersed in a treating composition composed of 0.1 mol TBH, 0.1 mol glycerine and 90 g t.-butyl alcohol at room temperature for two minutes, withdrawn from the treating composition, washed with water and then dried.

On the other hand, in a mixer were together kneaded 100 parts of vinyl chloride resin (Geon 131, produced by Nippon Zeon Co., Ltd.), 60 parts of dioctyl phthalate, 3 parts of a stabilizer (S-67J, produced by Katsuta Kako Co., Ltd.) and 40 parts of an epoxy resin (Epikote 828, produced by Shell Oil Inc.) to form a mixture thereof which was incorporated with 4 parts of diethylenetriamine, further kneaded for 5 minutes and then defoamed by the use of a vacuum defoamer to obtain a sol.

The sol so obtained was coated on said shaped rubber articles and then heated to 180°C for 10 minutes in a heated air-circulation type oven to produce composites which were then subjected to an adhesion test. The results were that the layers bonded with each other at the interface were not peeled while the vinyl chloride resin sheets were broken. In contrast with this, the shaped rubber articles which had not been immersed in said treating composition exhibited a peel strength of only 2 Kg/cm with the breakage of the bonded interface.

EXAMPLE 14

Using the usual technique there were together kneaded 100 parts of vinyl chloride resin (Geon 121, produced by Nippon Zeon Co., Ltd.), 40 parts of dioctyl phthalate, 30 parts of trimethylolpropane trimethacrylate, 3 parts of a stabilizer (S-67J, produced by Katsuta Kako Co., Ltd.) and 1 part of benzoyl peroxide to form a mixture which was then pressure molded at 160°C for 10 minutes thereby preparing sheets (100mm × 20mm × 2mm, surface hardness 68). The sheets thus prepared were immersed in a surface-active agent (sodium dodecylbenzenesulfonate) for 3 minutes, washed with water and then dried. The sheets so treated were coated using a brush at room temperature with a treating composition consisting of 0.1 mol TBH, 0.05 mol glycerine and 0.6 mol t.-butyl alcohol. The thus-coated sheets were washed with methanol, dried, coated with an epoxy resin and then bonded with each at 70°C for 2 hours to obtain composites.

The thus-obtained composites, after allowed to stand for 24 hours, were tested for shearing strength in the same manner as in Example 6. The results are indicated in Table 15.

Table 15

| Number of times of coating with a brush | 0 | 1 | 2* | 3* |
|---|---|---|---|---|
| Shearing strength (Kg/cm²) | 16 (19)** | 38 | 47 (13)** | 63 |

*Approximately 1.5 minutes after a coating of the treating composition has been dried, the following coating was formed with the use of a brush. This applies to the following Examples.
**The sheets containing no trimethylolpropane trimethacrylate were bonded with each other.

From Table 15 it is apparent that the composites prepared according to this invention are extremely excellently bonded ones as compared with those obtained without the treatment by the treating composition and without the use of trimethylolpropane trimethacrylate, as to the adhesion of soft-type vinyl chloride resin.

EXAMPLE 15

Following the procedure of Example 14 except that the trimethylolpropane trimethacrylate was substituted by 30 parts of a compound having ethylenic unsaturation as indicated in Table 16, composites (coating of the treating composition with a brush being carried out twice) were prepared and then tested for shearing strength. The results are shown in Table 16.

Table 16

| Compound having inter-carbon ethylenic unsaturation | Trimethylolpropane trimethacrylate/ diallyl phthalate (1/1) | Diallyl phosphate | Diallyl itaconate |
|---|---|---|---|
| Shearing strength (Kg/cm²) | 35 | 61 | 24 |

EXAMPLE 16

Following the procedure of Example 14 except that the soft type vinyl chloride resin sheet composites were substituted by those prepared by bonding the soft type vinyl chloride resin sheet with an aluminum sheet the surface of which has been polished with abrasive paper to obtain composites (coating twice with the treating compositions using a brush) which were then tested for shearing strength with the result of 72 Kg/cm². In addition, the use of lumber, glass or cement in substitution for the aluminum also gave excellent shearing strength.

EXAMPLE 17

Following the procedure of Example 14 except that the sheets used in Example 14 were substituted by those prepared from 100 parts of vinyl chloride resin (Geon 103 EP, produced by Nippon Zeon Co., Ltd.), 40 parts of dioctyl phthalate, 30 parts of diallyl phthalate, 3 parts of a stabilizer (S-67J, produced by Katsuta Kako Co., Ltd.) and 1 part of benzoyl peroxide, composites were obtained and then tested for shearing strength. The results are shown in Table 17.

Table 17

| Number of times of coating with treating composition with a brush | 1 | 2 | 3 |
|---|---|---|---|
| Shearing strength (Kg/cm²) | 54 | 65 | 78 |

Examples 18 – 20 indicate the improvement of fillers in adhesion to base material in which they are incorporated.

EXAMPLE 18

One hundred and fifty grams of a filler material were immersed in a treating composition comprising 150 g of t.-butyl alcohol, 10.8 g (0.1 mol) of t.-butyl hypochlorite and 9.2 g (0.1 mol) of glycerine, at ambient temperature for 3 hours, washed with methanol and then dried to obtain a treated filler. On the other hand, there were together kneaded 100 parts of vinyl chloride resin (Geon 131, produced by Nippon Zeon Co., Ltd.), 60 parts of dioctyl phthalate, 3 parts of a stabilizing agent SC-32 (Ca-Zn type), 20 parts of an epoxy resin (Epikote 828, produced by Shell Oil Inc.), 20 parts of a polyamine (EH 215, produced by Asai Denka Co., Ltd.) and 50 parts of said filler (in the powder form) to obtain a sol-like mixture which was melted at 180°C for 15 minutes and then shaped into sheets. Test pieces (2mm thick × 10mm wide × 100mm long) were prepared from said sheets and then tested for tensile strength and elongation using an Instron tensile tester. The results are indicated in Table 18.

Table 18

| Filler material | Treating agent | Tensile strength (Kg/cm²) | Elongation (%) |
|---|---|---|---|
| Polybutadiene resin*¹ (powder) | None | 64.67 | 70 |
| " | TBH and Glycerine | 114.90 | 60 |
| Used tire*² (powder) | TBH and Glycerine | 102.51 | 58 |

*¹Powder obtained by kneading 100 parts of a polybutadiene (molecular weight, 240,000; 1,2-addition, 80%) with 5 parts of dicumyl peroxide on a roll at ambient temperature and press molding the resulting mixture at 160°C for 15 minutes to form sheets which were pulverized by a pulverizer into powder having a particle size of not larger than 0.5 mm.
*²30-mesh or finer, vulcanized rubber powder obtained from used tire.

EXAMPLE 19

The same surface-treated polybutadiene resin powder (treated with TBH and glycerine) as used in Example 18, which was to be used as a filler in this case, was incorporated with other ingredients as indicated in Table 19 to form a mixture which was heat cured at 70°C for 1 hour and then at 170°C for 2 hours to obtain shaped sheets having a size of 5mm thick × 11.27mm wide × 650mm long. These sheets were tested for impact absorption energy using an Izod impact tester (produced by Toyo Seiki Co., Ltd.).

For comparison, the test sheets wherein the non-surface treated polybutadiene resin powder was used in substitution for the surface-treated one as mentioned above, were subjected to the same test as above. The results obtained are shown in Table 19.

Table 19

| Ingredients | | |
|---|---|---|
| Unsaturated polyester resin | 100 (Parts) | 100 (Parts) |

Table 19-continued

| Ingredients | | |
|---|---|---|
| (Polymer 6702, produced by Takeda Pharmaceutical Co., Ltd.) | | |
| 6% cobalt naphthenate | 1 | 1 |
| 55% methyl ethyl ketone peroxide (Permic N, produced by Nippon Yushi Co., Ltd.) | 1 | 1 |
| Filler (surface-treated polybutadiene resin powder) | 50 | — |
| Filler (non-surface treated polybutadiene resin powder) | — | 50 |
| Impact absorption energy (Kg-cm/cm) | 2.25 | 1.68 |

Examples 20 – 26 indicate the surface treatment of the ethylenically unsaturated rubber or synthetic resin substrate thereby allowing a paint or printing ink to be securely bonded with the surface-treated substrate.

EXAMPLE 20

Shaped articles (substrates) of a terpolymer composed of 25 parts of acrylonitrile, 20 parts of butadiene and 55 parts of styrene were immersed respectively in mixtures of a 25 vol.% solution of t.-butyl hypochloride (TBH) in t.-butyl alcohol and each of the functional compounds in the same molar amount as the TBH at room temperature for 15 minutes. The substrates withdrawn respectively from the mixtures were thoroughly washed with water and dried. The dried substrates were coated respectively with the various paints as indicated in Table 20 and then allowed to stand at room temperature for a week thereby having the paint coatings thoroughly cured or hardened. Each of the paint-coated substrates were cut on the surface just through the paint coating thereof so that the cut lines defined the paint coating into 100 squares of 1mm × 1mm. Filament type No. 898 (produced by Sumitomo Three M Co., Ltd.) was applied to these defined squares, pressed against the squares and then quickly pulling one end of the tape in the direction of an angle of 180° made with said end in attempt to peel the tape from the squares in order to find how many thereof were peeled with the tape from the original substrate. The results are shown in Table 20 wherein the numerals indicate the number of the squares remaining on the original substrate without being peeled with the tape.

Table 20

| Paint | Functional compound | — (TBH was not used, either.) | Glycerine | 1,4-butane-diol | Salicylic acid | Malonic acid | Phosphoric acid |
|---|---|---|---|---|---|---|---|
| Epoxy type | *1 | 30 | 100 | 100 | 100 | 100 | 100 |
| Acrylic acid type | *2 | 50 | 100 | 100 | 100 | 100 | 100 |
| Phthalic acid type | *3 | 0 | 95 | 56 | 66 | 80 | 100 |
| Urethane type | *4 | 10 | — | 91 | — | 54 | — |
| Aminoalkyd type | *5 | 5 | 80 | 94 | — | 56 | 72 |

*1 Million No. 1 A — produced by Kansai Paint Co., Ltd.
*2 Acrylic No. 2026 Clear — produced by Kansai Paint Co., Ltd.
*3 Phthalit Varnish — produced by Kansai Paint Co., Ltd.
*4 Urethane No. 3000 Grade — produced by Kansai Paint Co., Ltd.
*5 Melky No. 200 Clear — produced by Kansai Paint Co., Ltd.

(This applies to the following Examples.)

This Table indicates that the surface treatment according to this invention allowed the paint coatings to be securely bonded with the substrates.

EXAMPLE 21

Following the procedure of Example 20 except that the paint-coated substrates to be tested were exposed outdoors for three weeks in substitution for the ones of Example 20 being allowed to stand at room temperature for a week, the paint coatings were tested for their peel strength. The results are shown in Table 21.

Table 21

| Paint | Functional compound | Glycerine | 1,4-butane-diol | Malonic acid | Phosphoric acid |
|---|---|---|---|---|---|
| Epoxy type | | 100 | 100 | 100 | 100 |
| Acrylic acid type | | 100 | 100 | 86 | 100 |
| Phthalic acid type | | 72 | 62 | 60 | 100 |
| Aminoalkyd type | | 70 | 86 | 58 | 75 |

From Table 21 it is apparent that the surface treatment of this invention provides the paint coatings with excellent weatherproofing.

EXAMPLE 22

Following the procedure of Example 20 except that the substrates to be coated with the paint were allowed to stand in the air for a month between the surface treatment with the treating composition and the application of the paint and were then immersed in water at 25°C for a week, the paint coatings were tested for peel strength. The results are shown in Table 22.

Table 22

| Paint | Functional compound | — (TBH was not used, either.) | Glycerine | 1,4-butane-diol | Malonic acid | Phosphoric acid |
|---|---|---|---|---|---|---|
| Epoxy type | | 30 | 100 | 100 | 100 | 100 |
| Acrylic acid type | | 50 | 100 | 100 | 100 | 100 |
| Aminoalkyd type | | 5 | 80 | 65 | 50 | 62 |

From Table 22 it is apparent that if the original substrates after treated with the treating composition, were contacted with the air and water, they allowed the coated paint to be securely bonded therewith.

EXAMPLE 23

On rolls were together kneaded 100 parts of polyvinyl chloride resin (Geon 103 EP, produced by Nippon Zeon Co., Ltd.), 10 parts of methyl methacrylate-butadiene-styrene resin (Hi-Blen 203, produced by Nippon Zeon Co., Ltd.), 4 parts of a cadmium-barium (Cd-Ba) type stabilizer and 10 parts of dioctyl phthalate to form a mixture which was then press molded into sheets of 2mm in thickness. Following the procedure of Example 20 except that these sheets were substituted for those used in Example 20, paint coatings formed on the sheets were tested for peel strength with the results as shown in Table 23.

Table 23

| Functional compound | (TBH was not used, either.) | Gly-cerine | Malo-nic acid | Phos-phoric acid |
|---|---|---|---|---|
| Paint | | | | |
| Epoxy type | 45 | 100 | 100 | 100 |
| Acrylic acid type | 70 | 100 | 100 | 100 |
| Phthalic acid type | 41 | 100 | 100 | 100 |
| Aminoalkyd type | 22 | 85 | 96 | 82 |

EXAMPLE 24

The same resin as used in Example 20 was press molded into sheets having a size of 0.5mm thick × 20cm wide × 200cm long. The sheets so obtained were surface treated in the same manner as Example 20 and then dried. The surface-treated sheets were coated in a depth of 0.3mm with an offset printing ink ["Speed King Ace" (indigo), produced by Toyo Ink Co., Ltd.] using a printing aptitude tester $R_1$ (produced by Mei Seisakusho Co., Ltd.), allowed to stand at room temperature for two hours and dried. The sheets so printed were then tested for adhesion of ink to the resin substrate (this test being the same as in Example 20) and for surface appearance (gloss and unevenness). The results are shown in Table 24.

Table 24

| Functional compound | — (TBH was not used, either.) | Glycerine | Glycerine | Malonic acid | Phosphoric acid | Potassium bichromate-sulphuric acid mixed solution |
|---|---|---|---|---|---|---|
| Time of immersion in treating composition (min.) | — | 10 | 20 | 15 | 15 | 15 |
| Number of squares, which were not peeled, per 100 squares | 32 | 100 | 100 | 100 | 100 | 100 |
| Appearance of ink coating | Bad | Good | Excellent | Good | Excellent | Excellent |

EXAMPLE 25

On 6-inch rolls were together kneaded 100 parts of polyisoprene rubber (Nipol IR 2200, produced by Nippon Zeon Co., Ltd.), 5 parts of zinc oxide, 2.5 parts of sulphur, 1 part of stearic acid, 40 parts of HAF carbon black, 2 parts of dimercaptobenzothiazol and 1 part of diphenylguanidine to form a mixture which was press vulcanized at 150°C for 20 minutes thereby obtaining rubber sheets. These sheets were cleaned with acetone, dried, immersed in the treating composition as indicated in Table 25 for 10 minutes, withdrawn from the treating composition, washed with water and then dried. The sheets so treated were coated respectively with the paints as indicated in Table 25, dried and then tested in the same manner as in Example 20 to see the adhesion of the paint to the rubber substrate.

Table 25

| | Treating composition | TBH | 12.5 g | TBH | 12.5 g | TBH | 12.5 g |
|---|---|---|---|---|---|---|---|
| | | 1,4-butane-diol | 12.5 g | Malonic acid | 12.5 g | Phosphoric acid | 12.5 g |
| Paint | | t.-butyl alcohol | 75 g | t.-butyl alcohol | 75 g | Methyl ethyl ether | 75 g |
| Epoxy type | | 50 | | 100 | | 100 | |
| Phthalic acid type | | 45 | | 90 | | 100 | |
| Aminoalkyd type | | 25 | | 85 | | 90 | |

EXAMPLE 26

There were together kneaded on 6-inch rolls, 100 parts of styrene-butadiene rubber (Nipol 1502, produced by Nippon Zeon Co., Ltd.), 5 parts of zinc oxide, 18 parts of sulphur, 1.5 parts of stearic acid, 40 parts of HAF carbon black, 1.5 parts of dibenzothiazyldisulphide and 0.7 parts of diphenylguanidine to form a mixture which was then subjected to press vulcanization at 150°C for 15 minutes to obtain rubber sheets. The sheets so obtained were cleaned with acetone, dried, immersed in the treating composition as indicated in Table 26 for 5 minutes, washed with water and then allowed to stand for a full day. The sheets so treated were coated respectively with the paints as shown in Table 26, allowed to stand for 20 hours and bended at an angle of 180° to see how the paint coatings were or were not peeled from the sheet substrates. The results are shown in Table 26.

Table 26

| Treating composition | TBH | 13 ml | TBH | 13 ml |
|---|---|---|---|---|
| | Salicylic acid | 12.5 g | 2-methyl-2,4-pentane-diol | 13 ml |
| Paint | t.-butyl alcohol | 96 ml | t.-butyl alcohol | 96 ml |
| Epoxy type | Peeled | | Not peeled | |
| Urethane type | Peeled | | Not peeled | Not peeled |

Table 26-continued

| Treating composition | TBH Salicylic acid | 13 12.5 | ml g | TBH 2-methyl-2,4-pentanediol | 13 13 | ml ml |
|---|---|---|---|---|---|---|
| Paint | t.-butyl alcohol | 96 | ml | t.-butyl alcohol | 96 | ml |
| Aminoalkyd type | Peeled | Not peeled | | Not peeled | | |

Examples 27 – 28 indicate the surface treatment of the ethylenically unsaturated substrate to provide it with antistatic property.

EXAMPLE 27

There were together kneaded on rolls, 100 parts of polyvinyl chloride (Geon 103 EP, produced by Nippon Zeon Co., Ltd.), 10 parts of methyl methacrylate-butadiene-styrene terpolymer resin (Hi-Blen 205, produced by Nippon Zeon Co., Ltd.), 2 parts of tin maleate and 5 parts of lead stearate to form a blend which was then press molded into 1mm thick sheets at 150°C. These sheets were immersed in a treating solution of 10.0 parts of t.-butyl hypochlorite, 13.6 parts of phosphoric acid and 76.4 parts of ethyl ether, withdrawn from the solution after lapse of the predetermined time, washed with methanol, washed with water and dried. The sheets so treated were then tested for their half life of electrostatic voltage using a rotary static tester (of Kyoto University Chemical Laboratory type). In this test, cotton was used as the material to be rubbed at ambient temperature and humidity, the rubbing was stopped upon measurement of the electrostatic voltage 1 minute after the start of the rubbing and the half life was expressed by the time length between the time at which the rubbing was stopped and the time at which the electrostatic voltage was reduced by half. The results are shown in Table 27.

Table 27

| Time of immersion of sheet in treating solution (min.) | Half life of electrostatic voltage (sec., 65% RH) |
|---|---|
| (Not immersed) | ∞ |
| 2 | 200 |
| 10 | 45 |

From Table 27 it is seen that the half life of electrostatic voltage of the synthetic resin sheets were remarkably reduced by subjecting them to surface treatment of this invention.

EXAMPLE 28

Sheets (2mm thick) of a commercially available acrylonitrile-butadiene-styrene terpolymer resin (butadiene content: 25% by weight) were immersed in a treating solution comprising 10 parts of t.-butyl hypochlorite, 10 parts of glycerine and 80 parts of ethane dichloride. The thus-treated sheets were then tested for their half life of electrostatic voltage in the same manner as in Example 27. The results are indicated in Table 28.

Table 28

| Time of immersion of sheet in treating solution (min.) | Half life of electrostatic voltage of sheet (sec.) |
|---|---|
| (Not immersed) | ∞ |
| 2 | 45 |
| 10 | 10 |

This Example also indicates that an excellent antistatic effect was obtained by the practice of surface treatment of this invention.

Example 29 indicates that the surface treatment of this invention is effective in providing the ethylenically unsaturated rubber or synthetic resin with a property to inhibit hydrocarbons to permeate therethrough.

EXAMPLE 29

On 8-inch rolls were together kneaded 100 parts of acrylonitrile-butadiene copolymer rubber (Nipol 1042, produced by Nippon Zeon Co., Ltd.), 5 parts of zinc oxide, 1 part of stearic acid, 1.5 parts of sulphur, 40 parts of FEF carbon black, 1.5 parts of dibenzothiazyl disulphide and 0.5 parts of diphenyl guanidine to form a mixture which was pressed into sheets (2mm thick) at 150°C for 30 minutes. The sheets thus obtained were immersed in the treating composition as indicated in Table 29 at room temperature (about 25°C) for 30 seconds, washed with methyl alcohol and with water, and then dried. The thus-treated sheets were cut into circular pieces having a 63-mm diameter which were tested using gasoline (this gasoline being ASTM Fuel B and a mixture consisting of isooctane and toluene in the ratio by volume of 70 : 30 to determine the amount (g) of gasoline permeating through the piece ($cm^2$) per day. The results are shown in Table 29.

Table 29

| Treating composition (Volume ratio) | Amount of gasoline permeated ($10^{-3}$ g/day × $cm^2$) |
|---|---|
| None | 20.3 |
| t.-butyl hypochlorite/35% HCl/ t.-butyl alcohol (5 / 5 / 90) | 1.1 |
| t.-butyl hypochlorite/acetic acid/ t.-butyl alcohol (10 / 18 / 72) | 1.7 |

Examples 30 – 33 indicate that the surface treatment of the ethylenically unsaturated material according to this invention provides said material with adsorbing and ion-exchanging capabilities.

EXAMPLE 30

One hundred parts of polybutadiene resin (1,2-addition, 80%; molecular weight 240,000) and 5 parts of dicumyl peroxide were together kneaded on rolls at room temperature to form a mixture which was press molded into sheets at 160°C for 15 minutes. The sheets so obtained were pulverized by a pulverizer to prepare two groups of particles, one group having a mesh size of 32 – 42 meshes and the other a mesh size of 100 – 150 meshes.

A treating composition was prepared by incorporating a 25 vol. solution of t.-butyl hypochlorite (TBH) in t.-butyl alcohol with glycidol in the amount of 1.5 mol per mol of TBH.

Twenty-five grams of the polybutadiene particles mentioned above were immersed in 500 g of said treating composition under the conditions as indicated in Table 30. Five grams of the particles so treated were added to 20 cc of a 0.5% aqueous solution of urea in benzidine or dimethylformamide, the solution being previously prepared in a triangular flask. The flask so charged was stoppered and shaken to agitate the contents for 30 minutes. The particles so treated in the flask were withdrawn therefrom, washed three times with water and then subjected to elemental analysis to see the amount of the material absorbed by every one gram of the particles. (This amount was specifically concerned with the measured amount of the nitrogen-containing compound remaining in said urea solution used.) The results are shown in Table 30.

material to be adsorbed) were used as the treating liquid.

The results are shown in Table 31.

Table 31

| Functional compound used together with TBH | Exchange capacity (mg/g) | |
|---|---|---|
| | Chromium chloride | Copper chloride |
| — (TBH was not used, either.) | 0.8 | 0.7 |
| Succinic acid | 5.2 | 8.1 |
| Phosphoric acid | 7.0 | 18.3 |
| Boric acid | 5.6 | 10.4 |

Table 30

| Particle size (mesh size) of polybutadiene resin particles | Conditions under which resin particles are treated with treating composition | | Amount adsorbed (mg/g) | | |
|---|---|---|---|---|---|
| | | | Urea | Benzidine | Dimethyl-formamide |
| 32 – 42 | Not immersed | | 0 | 0 | 0 |
| G2 | Room temp., | 17 hours | 31.9 | 28.0 | 14.3 |
| " | 60°C, | 2 hours | 20.9 | 17.3 | 6.0 |
| 100 – 150 | Room temp., | 17 hours | 27.3 | 24.7 | 11.2 |
| " | 60°C, | 2 hours | 18.3 | 11.0 | 4.0 |
| (Activated carbon*) | — | — | 0 | 0 | 0 |

*CAL, produced by Calgon Inc.

From Table 30 it is apparent that the resin particles treated according to this invention exhibited excellent adsorbing capability or adsorbency.

EXAMPLE 31

A commerically available, natural rubber sponge (dia. of cells: about 0.5 mm) was passed through rolls successively 3 times to form it into an open-cellular foamed body which was then cut into cubes (1cm × 1cm × 1cm).

A treating liquid was prepared by mixing a 25 vol. % solution of TBH in t.-butyl alcohol with a 20 vol. % solution of the functional compound as shown in Table 31 in such amount that, in the resulting mixture, the functional compound and the TBH are present in the molar ratio of 1.5 : 1.0.

Twenty of said sponge cubes or pieces were immersed in 200 cc of said treating liquid at 60°C for 4 hours, withdrawn from the liquid, washed three times with water and dried. The sponge pieces thus treated were solidified while losing their rubbery elasticity and they were satisfactorily wettable with water. Ten of the thus-treated pieces were immersed in 300 cc of an 0.5% aqueous solution of chromium chloride (the material to be adsorbed) contained in a glass beaker, agitated for 3 hours, withdrawn from the solution and washed twice with 500 cc of water. The washings and said chromium chloride solution used were tested for total amount of metal contained therein by the use of an atomic light absorption apparatus. On the other hand, the treated sponge pieces which adsorbed the metal were decomposed in boiling sulphuric acid to collect therefrom the metal in the form of an aqueous solution of the salt of the metal. The metal so collected was tested for its exchange capacity by the use of an atomic light absorption apparatus. Said total metal amount found was in satisfactory agreement with the corresponding exchange capacity.

The remaining ten pieces were treated and tested in the same manner as mentioned above except that 300 cc of an 0.2% aqueous solution of copper chloride (the

EXAMPLE 32

A cooled 20 vol. % solution of 2,3-pyrazinedicarboxylic acid in ethyl acetate was slowly and dropwise added to a 25 vol. % of TBH in t.-butyl alcohol under agitation to form a treating liquid (the molar ratio of the 2,3-pyrazinedicarboxylic acid to TBH being 1.5 : 1 in the resulting treating liquid). Ten of the same test sponge pieces as used in Example 31 were immersed in 200 cc of said treating liquid cooled to room temperature, heated to 40°C for 5 hours, taken out of the liquid, washed with water and dried. The sponge pieces so treated were immersed in 100 cc of a 5 vol. % solution of hydrochloric acid (the material to be adsorbed), allowed to stand therein under agitation for 30 minutes and then tested for concentration of hydrochloric acid adsorbed. The amount adsorbed which was calculated from the concentration found, was 24 mg of hydrochloric acid per gram of the sponge.

EXAMPLE 33

A non-woven cloth (2 mm thick) made of polyacrylonitrile fibers was immersed in a 2% latex of styrene-butadiene copolymer rubber (Nipol LX 204, produced by Nippon Zeon Co., Ltd.), passed through rolls for squeezing and dried in heated air at 105°C thereby preparing a non-woven cloth impregnated with the rubber in the amount of about 5% by weight of the cloth (the non-woven cloth in this rubber-impregnated state being unsatisfactorily wettable with water). The non-woven cloth so impregnated was immersed in the same treating liquid (TBH-phosphoric acid-t.-butyl alcohol) as used in Example 31, at 60°C for 30 minutes, withdrawn from the liquid, washed with water and dried. The rubber-impregnated cloth treated (ion exchanger) according to this invention wherein the impregnated rubber was solidified, was satisfactorily wettable with water and exhibited permeability to water as a filter cloth. The thus-treated cloth, that is, ion exchanger was cut into pieces (3 cm × 3 cm). Some of seven (8.4 g) of these pieces were immersed in 200 cc of the same chromium chloride solution as used in Example 31 and the remainder in 200 cc of the same copper chloride solution as used in Example 31, at room temperature for 30 minutes. The ion exchangers so obtained were withdrawn respectively from the solutions, washed with water and tested for exchange capacity in the same manner as in Example 31, with the result that the exchange capacity was 3.0 mg/g for chromium chloride and 4.6 mg/g for copper chloride while the exchange capacity was 0 mg/g for chromium copper chlorides without the surface treatment of this invention.

Examples 34 – 46 indicate that the surface treatment of the ethylenically unsaturated rubber or synthetic resin impregnated in, for example, cellulosic fibers or paper with the treating agents of this invention provides the rubber- or resin-impregnated fibers or paper with flame retardation, self-extinction, water repellency or the like.

EXAMPLE 34

Cotton cloths were immersed in a latex of butadiene-acrylonitrile copolymer (Nipol 1571, produced by Nippon Zeon Co., Ltd.), withdrawn from the latex and dried. The cotton cloths so dried were immersed for 15 minutes in a treating solution (A) comprising 5 parts of t.-butyl hypochlorite, 4.5 parts of phosphoric acid and 90.5 parts of ethyl ether, taken out of the treating solution, washed with methanol and washed with water. The thus-treated cotton cloths were tested for flame retardation or anti-combustibility. The results are shown in Table 32.

This combustion test was carried out under the conditions of flame length of 4.5 cm, flame contact time of 1 minute, test piece length of 30 cm and an angle of 45° for supporting the test piece, by the use of an apparatus for determining the combustibility of thinly made building materials in accordance with JIS (Japanese Industrial Standard) A 1322. This test method applies to the following Examples.

Zeon Co., Ltd. This applies to the following Examples.) was used as the latex and the amount of rubber impregnated in cotton cloth was 13.9% by weight of the cotton cloth, combustion tests were made. The results are as follows:

| | |
|---|---|
| Time taken for ignition | 16.0 sec. |
| Combustion time | 40 sec. |
| Length of test piece carbonized | 7.5 cm |
| Self-distinction | Excellent |

EXAMPLE 36

A butadiene-acrylonitrile copolymer latex was impregnated in cotton cloths (amount of rubber impregnated: 18.5 wt.%). The thus-impregnated cotton cloths were immersed in a treating solution comprising 3 parts of t.-butyl hypochlorite, 1 part of hydrogen chloride and 96 parts of t.-butyl alcohol for 10 minutes. The rubber so treated was subjected to a combustion test with the result that the time taken for ignition was 6.0 seconds while such time was 1.0 second when a treating solution used was different from the aforesaid one in that it did not contain t.-butyl hypochlorite.

EXAMPLE 37

Cotton cloths were impregnated with a vinylpyridine-containing butadiene-styrene copolymer latex to produce a rubber-impregnated cotton cloths (amount of rubber impregnated: 9.5% by weight) which were immersed for 10 minutes in a treating solution (B) comprising 5.0 parts of t.-butyl hypochlorite, 3.8 parts of hydron bromide and 91.2 parts of t.-butyl alcohol, withdrawn from the solution and subjected to a combustion test with the result that the time taken for ignition was 7.5 seconds. On the other hand, 1.0 second was needed for ignition when using a treating solution which was different from the aforesaid one in that it did not contain t.-butyl hypochlorite.

Table 32

| Test No. | 1 (Control) | 2 | 3 | 4 | 5* (Control) |
|---|---|---|---|---|---|
| Amount of rubber impregnated Wt.% based on cotton cloth | 0 | 5.3 | 7.8 | 12.0 | 14.0 |
| Time taken for ignition (sec.) | 3.0 | 7.0 | 10.0 | 14.0 | 1.0 |
| Combustion time (sec.) | >120 | >120 | 105 | 48 | >60 |
| Length of test piece carbonized (cm) | 30 | 23 | 18.5 | 9.3 | 30 |
| Self-extinction | None | None | Good** | Excellent** | None |

*T.-butyl hypochlorite was not used.
**"Excellent": Extinguished in 5 seconds after disappearance of flame;
"Good": Extinguished in 5 – 10 seconds after disappearance of flame.
(This note applies to the following Examples.)

From Table 32 it is seen that the test pieces which had not been impregnated with said latex or treated with t.-butyl hypochlorite were extremely combustible and, in contrast with this, the test pieces treated according to this invention were rendered remarkably flame retardant or combustion resistant. Particularly, with the increase in amount of rubber impregnated, flame retardation is enhanced and self-extinction is also provided.

EXAMPLE 35

Following the procedure of Example 34 except that a vinylpyridine-containing butadiene-styrene copolymer rubber latex (Nipol 2518 FS, produced by Nippon

EXAMPLE 38

There were prepared rubber-impregnated cotton cloths (amount of rubber impregnated: 16.0% by weight) by incorporating cotton cloths with a latex of carboxyl group-containing butadiene-styrene copolymer (Nipol 2570X5, produced by Nippon Zeon Co., Ltd.). The rubber-impregnated cloths were immersed for 1 minute in the same treating solution as the one (B) used in Examplee 37 and then immersed for 15 minutes in the same treating solution as the one (A) used in Example 34. The rubber-impregnated cloths so treated were subjected to a combustion test. The results are follows.

| | |
|---|---|
| Time taken for ignition | : 19.0 sec. |
| Combustion time | : 42.0 sec. |
| Length of test piece carbonized | : 6.8 cm |
| Self-extinction | : Excellent |

EXAMPLE 40

The same cotton cloths as treated in Test No. 3 of Example 34 and the same cotton cloths as treated in Example 38 were subjected to laundry with cleaning material for domestic laundry use and then to a combustion test. The results are shown in Table 34.

Table 34

| Test No. | 1 (Test No. 1 of Example 34) | 2 | 3 (Example 38) | 4 |
|---|---|---|---|---|
| No. of times of laundry | 0 | 2 | 0 | 3 |
| Time taken for ignition (sec.) | 10.0 | 8.0 | 19.0 | 16.0 |
| Combustion time (sec.) | 105 | 93 | 42 | 51 |
| Length of test piece carbonized (cm) | 18.5 | 19.8 | 6.8 | 8.7 |
| Self-extinction | Good | Good | Excellent | Excellent |

EXAMPLE 39

A latex of carboxyl group-containing butadiene-styrene copolymer was incorporated in filter paper to form rubber-impregnated filter paper which was treated in the manner as indicated in Table 33 and then subjected to a combustion test. The results are shown in Table 33.

From Table 34 it is seen that the cloths treated according to this invention retained satisfactory flame-retarding property even after subjected to laundry.

EXAMPLE 41

The cotton cloth and filter paper pieces respectively treated as indicated in Table 35 were tested for water repellency. The results are shown in Table 35 wherein water repellency is expressed by a time (in minute) for which a half of 16 water drops were impregnated in the test pieces.

Table 33

| Test No. | 1 (Control) | 2 | 3 |
|---|---|---|---|
| Amount of rubber impregnated (wt.% based on filter paper) | 0 | 19.1 | 16.8 |
| 1st treatment { Treating solution | — | A* | B** |
| 1st treatment { Treating time | — | 15 min. | 1 min. |
| 2nd treatment { Treating solution | — | — | A* |
| 2nd treatment { Treating time | — | — | 15 min. |
| Time taken for ignition (sec.) | 0 | 10 | 11 |
| Combustion time (sec.) | — | 35 | 24 |
| Length of test piece carbonized (cm) | 30 | 11.5 | 7.5 |
| Self-extinction | None | Good | Excellent |

*Composed of 5 parts of t.-butyl hypochlorite, 4.5 parts of phosphoric acid and 90.5 parts of ethyl ether.
**Composed of 5 parts of t.-butyl hypochlorite, 3.8 parts of hydrogen bromide and 91.2 parts of t.-butyl alcohol.

From Table 33 it is seen that the test pieces of filter paper treated according to this invention had excellent flame-retarding and self-extinguishing properties.

Table 35

| Test No. | 1 (Control) | 2 | 3 | 4 (Control) | 5 | 6 (Control) | 7 | 8 (Control) | 9 | 10 |
|---|---|---|---|---|---|---|---|---|---|---|
| Fiber or Paper | Cotton cloth | | | | | | | Filter paper | | |
| Latex | — | Butadiene-acrylonitrile copolymer latex | Carboxyl group-containing butadiene-styrene copolymer latex | — | Carboxyl group-containing butadiene-styrene copolymer latex | Vinylpyridine-containing butadiene-styrene copolymer latex | Vinylpyridine-containing butadiene-styrene copolymer latex | — | — | Vinylpyridine-containing butadiene-styrene copolymer latex |
| Amount of rubber impregnated (wt.%) | — | 14.1 | 12.1 | — | 12.1 | 10.8 | 10.8 | — | — | 5.0 |
| 1st treatment { Treating solution | — | — | B** | — | B** | — | B** | — | — | A* |
| 1st treatment { Treating time (min.) | — | — | 1 | — | 1 | — | 1 | — | — | 15 |
| 2nd treatment { Treating solution | — | — | A* | — | A* | — | A* | — | — | — |
| 2nd treatment { Treating time (min.) | — | — | 15 | — | 15 | — | 15 | — | — | — |
| Water repellency (min.) | 8.5 | 8.0 | 8.6 | 16.7 | >200 | >140 | >250 | 0 | 1 | >140 |

*Composed of 5.0 parts of t.-butyl hypochlorite, 4.5 parts of phosphoric acid and 95.0 parts of ethyl ether.
**Composed of 5.0 parts of t.-butyl hypochlorite, 3.8 parts of hydrogen bromide and 91.2 parts of t.-butyl alcohol.

From Table 35 it is apparent that the fibers or paper impregnated with the carboxyl group- or vinyl pyridine-containing latex according to this invention were remarkably superior in water repellency.

EXAMPLE 42

Cloths made of pure polyester (Trademark: Tetron) fibers were laundered, dried and cut into test pieces having a size of 1 cm wide × 15 cm long which were immersed in a liquid containing 12% by weight of rubber solids, the liquid being prepared from a latex of carboxyl group-containing butadiene-styrene copolymer, for several minutes, withdrawn from the liquid and then passed several times through squeezing rolls. This procedure was repeated twice to prepare test pieces with 8% by weight of the copolymer rubber impregnated therein. The rubber-impregnated test pieces were dried at room temperature, immersed in a treating solution comprising 10 parts of t.-butyl hypochlorite, 13.6 parts of phosphoric acid and 76.4 parts of ethyl ether for the predetermined times as indicated in Table 36, withdrawn from the solution, washed with methanol and further with water, and then dried. The test pieces thus treated were tested for electrostatic voltage and the half time thereof using cotton cloths as the material to be rubbed by the use of a Kyoto University Chemical Laboratory type rotary static tester at ambient temperature and humidity. The results are shown in Table 36 wherein the electrostatic voltages are those measured 1 minute after the start of rubbing and the half lives are times between the time at which the rubbing was stopped (upon said measurement, the rubbing was stopped) and the time at which the electrostatic voltages were reduced by half. (This definition of electrostatic voltages and the half lives thereof applies to the following Examples.)

Table 36

| Time of immersion of rubber-impregnated polyester cloth in treating solution (min.) | Electrostatic voltage (volt) | Half life (sec.) |
|---|---|---|
| (Pure polyester cloth) | - 3000 | ∞ |
| 2 | - 7600 | 41.2 |
| 10 | - 6400 | 26.8 |
| 20 | - 288 | 3.1 |

From Table 36 it is seen that the rubber-impregnated polyester cloths treated according to this invention had a remarkably short half life of electrostatic voltage. Particularly, the rubber-impregnated cloths subjected to the 20-minutes' immersion treatment were considered to discharge their charge in less than one second in view of the fact that said tester had a time lag of two seconds in responding.

EXAMPLE 43

Following the procedure of Example 42 except that pure polyester (Tetron) cloths were contacted with a latex of vinyl pyridine-containing butadiene-styrene copolymer rubber to impregnate therein the rubber in the amount of 6% by weight, the cloths so treated were tested for their electrostatic voltage and the half life thereof. The results are shown in Table 37.

Table 37

| Time of immersion of rubber-impregnated polyester cloth in treating solution (min.) | Electrostatic voltage (volt) | Half life (sec.) |
|---|---|---|
| (Pure polyester cloth) | - 3000 | ∞ |

Table 37-continued

| Time of immersion of rubber-impregnated polyester cloth in treating solution (min.) | Electrostatic voltage (volt) | Half life (sec.) |
|---|---|---|
| 2 | - 7400 | 11.5 |
| 10 | - 6800 | 5.2 |
| 20 | - 172 | 2.9 |

From this Table it is seen that the cloths treated according to this invention had excellent antistatic property.

EXAMPLE 44

Following the procedure of Example 42 except that polyester (Tetron) cloths impregnated with 7% by weight of the same rubber as used in Example 42 were immersed in a treating solution comprising 11.5 parts of t.-butyl hypochlorite, 13.5 parts of glycerine and 75 parts of t.-butyl alcohol, washed with t.-butyl alcohol and further with water, and then dried, the rubber-impregnated cloths so obtained were tested for their electrostatic voltage and the half life thereof. The results are shown in Table 38.

Table 38

| Time of immersion of rubber-impregnated polyester cloth in treating solution (min.) | Electrostatic voltage (volt) | Half life (sec.) |
|---|---|---|
| (Pure polyester cloth) | - 3000 | ∞ |
| 3 | - 6800 | 26.5 |
| 10 | - 1300 | 11.3 |
| 15 | - 104 | 2.6 |

The rubber impregnated cloths treated according to this invention were found to have excellent antistatic property.

EXAMPLE 45

Pure nylon cloths were contacted with a vinyl pyridine-containing butadiene-styrene copolymer rubber to achieve the impregnation of the cloths with the rubber in the amount of 6% by weight and then immersed in the same treating solution as used in Example 44. The rubber-impregnated cloths so treated were tested for their half life of electrostatic voltage in the same manner as in Example 44. The results are shown in Table 39.

Table 39

| Time of immersion of rubber-impregnated nylon cloth in treating solution (min.) | Half life of electrostatic voltage (sec.) |
|---|---|
| (Pure nylon cloth) | at least 480 |
| 5 | 32.4 |
| 10 | 11.3 |
| 15 | 4.2 |

From Table 39 it is seen that the rubber-impregnated nylon cloths treated according to this invention had excellent antistatic property.

EXAMPLE 46

Following the procedure of Example 42 except that mixed spun cloths of 35% polyester (Tetron) and 65% cotton were impregnated with a vinyl pyridine-containing butadiene-styrene copolymer latex (Pick-up value 10.4%), the rubber-impregnated cloths thus obtained were surface treated. The surface specific resistance was determined from the surface resistance and electric potential obtained by applying 100 volts to 3-centimeter square test pieces of said treated, rubber-impregnated cloths in an air stream at a temperature of 20°C and a relative humidity of 28%.

Table 40

| Time of immersion of rubber-impregnated mixed spun cloth in treating solution (min.) | Surface specific resistance (ohm) |
|---|---|
| (Pure mixed-spun cloth) | $2.69 \times 10^{12}$ |
| 15 | $4.00 \times 10^{11}$ |
| 30 | $5.68 \times 10^{10}$ |

From Table 40 it is seen that the mixed-spun cloths treated according to this invention had a lower surface specific resistance.

What is claimed:

1. A process for the surface treatment of a rubber or synthetic resin containing ethylenic unsaturation, comprising contacting said rubber, resin or mixture thereof with a treating agent consisting essentially of (A) an alkyl hypohalite selected from the group consisting of butyl hypohalites, amyl hypohalites and halogen-substituted methyl hypohalites and a compound (B) containing at least one active hydrogen and at least one functional group, said compound being selected from the group consisting of sulphuric acid, phosphoric acid, glycol, resorcin, 2-methyl-2,4-pentenediol, glycerine, malic acid, maleic acid, malonic acid, aldol, formamide, glycidol, thioglycolic acid and hydrochloric acid, the treating agent containing 0.1 – 10 moles of said compound B) per mole of the alkyl hypochlorite A.

2. A process according to claim 1, wherein the synthetic resin is a member selected from the group consisting of acrylonitrile-butadiene-styrene copolymer resins, methyl methacrylate-butadiene-styrene copolymer resins, highly styrene unit-containing resins, polybutadiene resins, high impact polystyrene prepared by graft polymerizing with styrene a polybutadiene, styrene-butadiene copolymer or styrene-isoprene copolymer, and unsaturated polyester resins, the resins being all ethylenically unsaturated and mixtures thereof.

3. A process for the surface treatment of a rubber or synthetic resin containing ethylenic unsaturation, comprising contacting said rubber, resin or mixture thereof with a treating agent consisting essentially of (A) an alkyl hypohalite selected from the group consisting of butyl hypohalites, amyl hypohalites and halogen-substituted methyl hypohalites and (B) a compound containing at least one active hydrogen and at least one functional group selected from the group consisting of hydroxyl, carboxyl, aldehyde, amino, epoxy, mercapto, sulfonyl, chlorine radical and bromine radical, the treating agent containing 0.1 – 10 moles of said compound B) per mole of the alkyl hypohalite A).

4. A process according to claim 1, wherein the alkyl hypohalite is a member selected from the group consisting of t.-butyl hypobromite, t.-butyl hypochlorite, t.-amyl hypobromite, t.-amyl hypochlorite, dichloromethyl hypochlorite, trichloromethyl hypochlorite, difluoromethyl hypochlorite and trifluoromethyl hypochlorite.

5. A process according to claim 3, wherein the ethylenically unsaturated rubber or synthetic resin is applied to chemical fibers selected from the group consisting of polyesters, polyamides, acrylics, polyvinyl chloride, polypropylene, rayon and mixtures of said chemical fibers and natural fibers selected from the group of cotton, hemp, wool and silk.

6. A process according to claim 5 wherein said chemical fibers are in the form of woven cloth, knitted cloth, non-woven cloth or spun yarn form.

7. A process according to claim 5, wherein the amount of said rubber or resin is at least 4% by weight of said chemical fibers.

8. The process according to claim 3, wherein said rubber or synthetic resin, after said surface treatment, is bonded to a material which is a member selected from the group consisting of vulcanized rubber, non-vulcanized rubber, synthetic resins, metals, fibers, leather, lumber, glass and concrete.

9. A process according to claim 3, wherein said rubber or synthetic resin, after said surface treatment, is coated with a paint having a base material selected from the group consisting of an epoxy, urethane, urea-formalin, acrylic, vinyl acetate, phthalic, melamine, a fluorocarbon resin, cellulose nitrate, a synthetic drying oil, cashew oil, and linseed oil or is coated with a printing ink.

10. A process according to claim 3, wherein the rubber is a member selected from the group consisting of natural rubber, polyisoprene rubber, polybutadiene rubber, butadiene-isoprene copolymer rubber, styrene-butadiene copolymer rubber, styrene-isoprene copolymer rubber, acrylonitrile-butadiene copolymer rubber, acrylonitrile-isoprene copolymer rubber, acrylonitrile-butadiene-isoprene copolymer rubber, high styrene rubber, cyclopentene polymer, polychloroprene rubber, ethylene-propylenediene terpolymer, epichlorohydrin-unsaturated epoxide copolymer rubber and isobutylene-isoprene copolymer rubber, the rubbers being all ethylenically unsaturated.

11. A process according to claim 3, wherein the ethylenically unsaturated rubber or synthetic resin is applied to paper and natural fibers selected from the group consisting of cotton, hemp, wool and silk, prior to said surface treatment.

12. A process according to claim 11, wherein natural fibers are in the form of woven cloth, knitted cloth, non-woven cloth or spun yarn form.

13. The process according to claim 9 wherein the amount of said rubber or resin is not less than 4% 4 – 19.1% by weight of said paper or natural fibers.

\* \* \* \* \*